US006968873B1

(12) United States Patent
Cariddi et al.

(10) Patent No.: US 6,968,873 B1
(45) Date of Patent: Nov. 29, 2005

(54) BAGEL AND PASTRY FILLER ATTACHMENT

(76) Inventors: Anthony J. Cariddi, 34 Maple St., Allendale, NJ (US) 07401; Rachel L. Cariddi, 34 Maple St., Allendale, NJ (US) 07401

( * ) Notice: Subject to any disclaimer, the term of this patent is extended or adjusted under 35 U.S.C. 154(b) by 0 days.

(21) Appl. No.: 10/866,282

(22) Filed: Jun. 14, 2004

(51) Int. Cl.[7] ................................................. B65B 1/04
(52) U.S. Cl. ...................... 141/329; 141/392; 222/566; 426/115
(58) Field of Search .................... 141/67, 329, 392; 222/566, 575, 175, 289; 426/115

(56) References Cited

U.S. PATENT DOCUMENTS

| 4,619,613 A | * | 10/1986 | Dragan ........................ 433/90 |
| 5,361,946 A | * | 11/1994 | Ginther et al. ............... 222/175 |
| 6,688,500 B1 | * | 2/2004 | Cheng ........................ 222/482 |

* cited by examiner

Primary Examiner—Steven O. Douglas
(74) Attorney, Agent, or Firm—Donald R. Heiner, Esq.

(57) ABSTRACT

A bagel or pastry filling device attachable to one end of a standard and well-known pastry filling or cake decorating gun. The inventive concept combines a bent piece of tubing made from any suitable material wherein one end has a sharp edge which is insertable into a bagel, donut, piece of pastry, and whose other end is inserted into a funnel where it is held in place by means of an insert placed inside the flared opening of the funnel which, while usually made of plastic, may be made of any suitable material. The pastry filling attachment is then inserted into a nut, usually made of plastic, which in turn engages a length of plastic tubing having external male threads.

A trigger device associated with a trigger handle threadably engages the opposite end of the plastic tubing and further holds a horizontally extending ratchet device for moving a plunger forward which squeezes filling into in and through the funnel and tubing and into a receiving device.

3 Claims, 3 Drawing Sheets

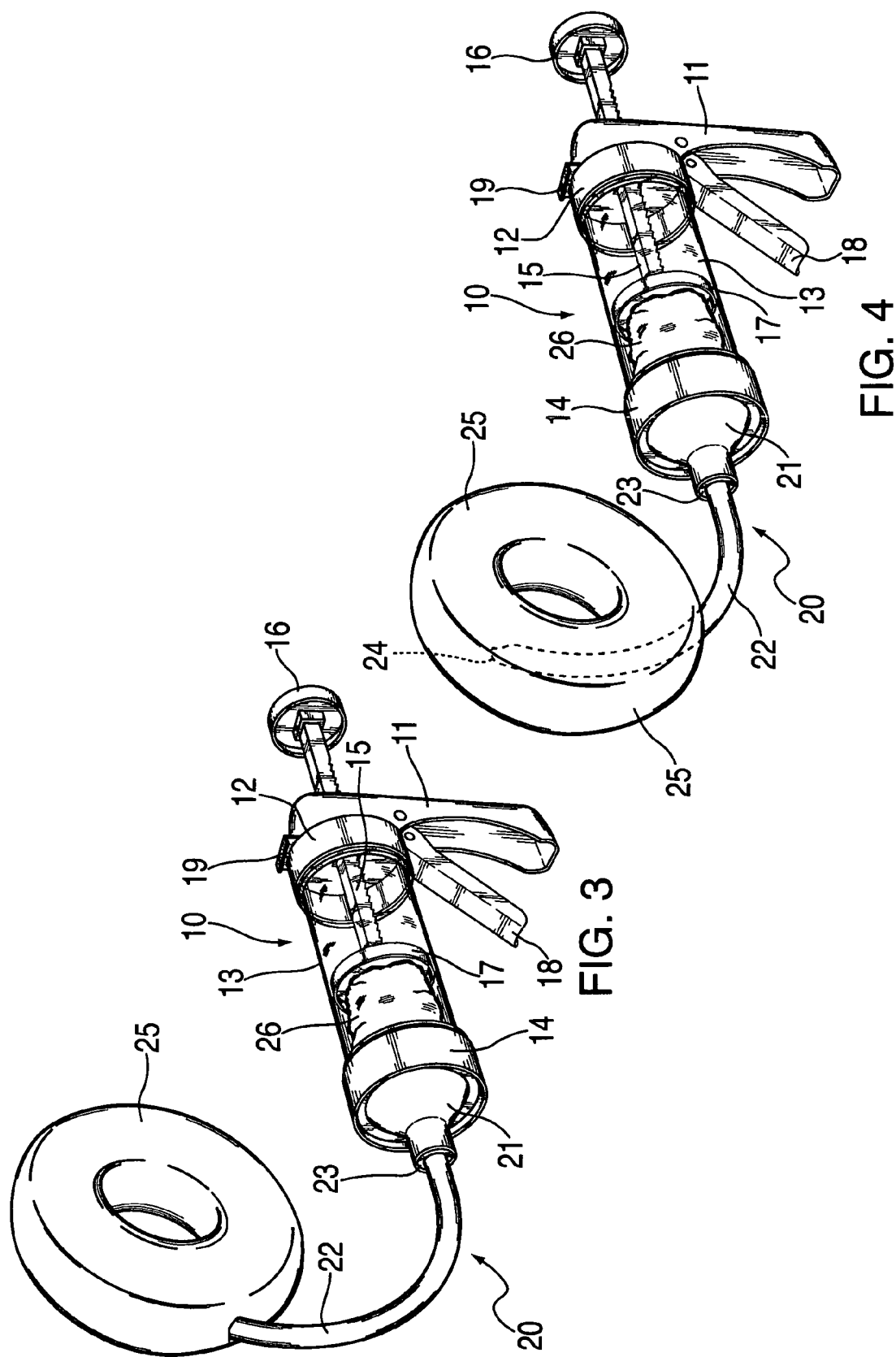

BAGEL AND PASTRY FILLER ATTACHMENT

BACKGROUND OF THE INVENTION

Field of Invention

The present invention generally involves the field of technology pertaining to a bagel or pastry filling device attachable to one end of a standard and well-known pastry filling gun.

While the pastry filling gun is well-known it will be described in general terms for the purpose of properly describing the inventive concept.

The inventive concept comprises a bent piece of tubing made from any suitable material wherein one end has a sharp edge and is insertable into a bagel, donut, piece of pastry, etc. as will be more fully described below and whose other end is inserted into a funnel where it is held in place by means of a metal insert placed inside the flared opening of the funnel which while usually made of plastic may be made of any suitable material.

The inventive device comprising these three elements are then inserted into a nut, usually made of plastic, and having female threads, which in turn engage a length of plastic tubing, having external male threads, and wherein the tubing can be other than plastic.

As will be more fully described below a trigger device threadably engages the other end of the plastic tubing and further holds a horizontally extending ratchet device for purposes to be described below.

SUMMARY OF INVENTION

According to the present invention, there is provided a bagel or pastry filling device or cake decorating device having a trigger mechanism for advancing, horizontally, a plunger disposed within a length of plastic or glass tubing or the like and wherein the plunger is operatively associated with a length of a serrated "U" shaped rod that extends horizontally through a trigger mechanism having a knob disposed at its other end opposite the plunger end.

Nuts having internal or female threads cooperate with external or male threads disposed about either end of the elongated cylinder.

A trigger mechanism disposed in a grip or handle at one end of the cake decorator or bagel filling device is operatively associated with the horizontally extending "U" shaped rod and advances the rod with each pull of the trigger.

The knob associated with the "U" shaped horizontally extending serrated rod is used to pull the rod and therefore the plunger back after it has advanced forward. A nut holding the funnel and bent tubing of the instant invention, and having internal or female threads, threadably engages external or male threads on the opposite end of the elongated tubing for reasons to be more fully described below.

It is therefore an object of the present invention to provide a trigger operated cake decorating or pastry filling device having a flared funnel associated with one end thereof.

It is another object of the invention to provide such a bagel or pastry filling device wherein a bent or curved piece of tubing is inserted into one end of said flared funnel device.

It is yet a further object of the invention to provide such a bagel or pastry filling device wherein said bent or curved tubing is held in place in a flared funnel by means of a metal insert placed inside the flared opening.

It is still a further object of the invention to provide such a bagel or pastry filling device wherein one end of the bent tubing, not inserted into the flared funnel, has a sharp edge which is insertable into a bagel, donut, piece of pastry, etc.

It is still a further object of the invention to provide a bagel or pastry filling device wherein said flared funnel is attached to one end of a length of plastic tubing by means of a nut which engages the length of plastic tubing containing a filling.

These and further objects, features and advantages of the invention shall become apparent from the following detailed description of a preferred embodiment thereof when taken in conjunction with the drawings, wherein like reference characters refer to corresponding parts in the several views.

BRIEF DESCRIPTION OF THE DRAWINGS

FIG. 3 is similar to FIG. 2 further disclosing one end of the bent or curved tubing inserted into a bagel or donut to be filled.

FIG. 4 is a view similar to FIG. 3 showing the bagel or donut rotated counterclockwise and further showing the bent or curved tubing in dotted lines inserted into the bagel or donut to be filled.

DETAILED DESCRIPTION OF THE PREFERRED EMBODIMENT

Figure 1:
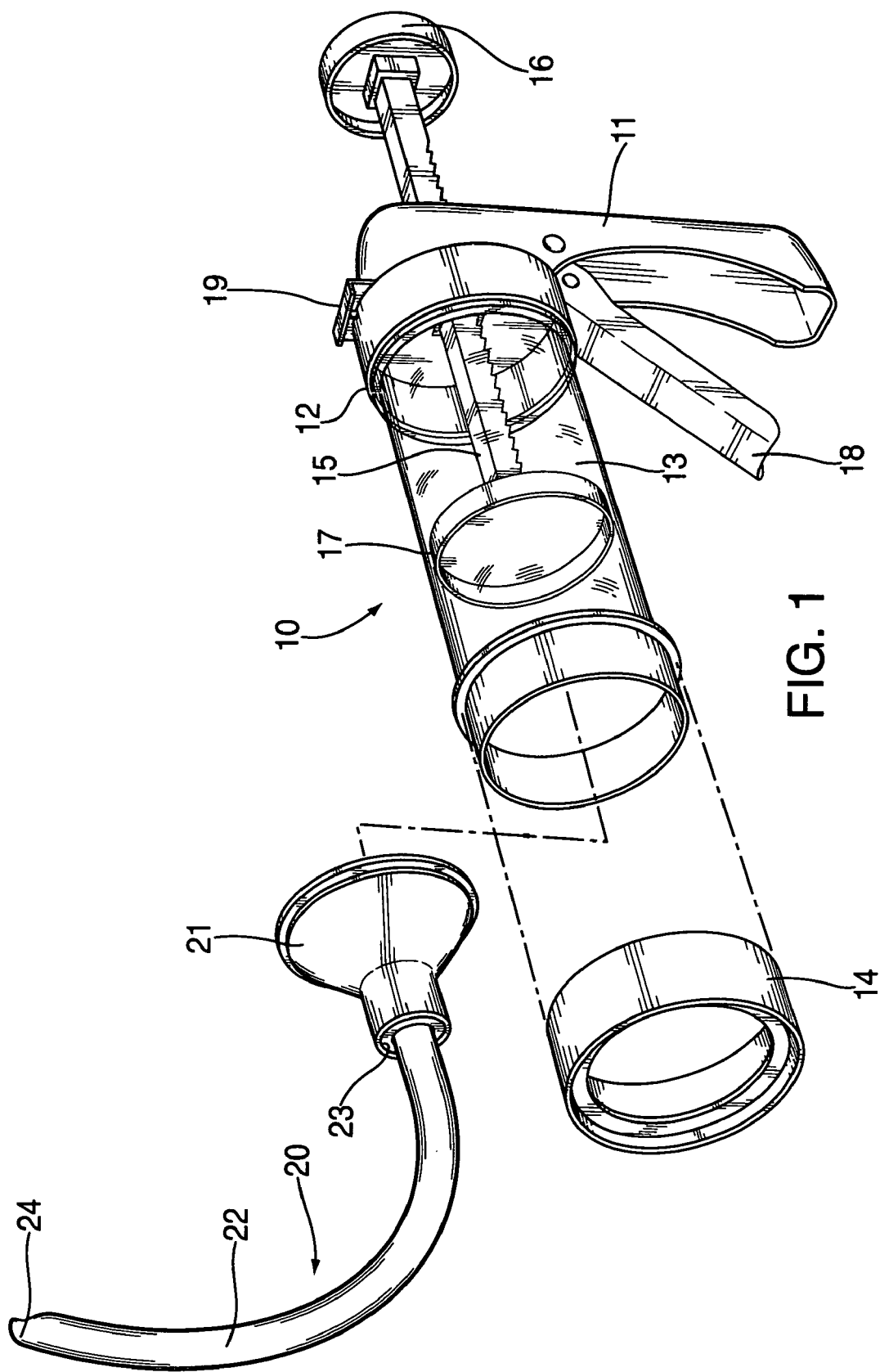
FIG. 1 is an exploded view of a pastry filling gun or cake decorating device in showing the inventive concept of the bent tubing inserted into a funnel device.
Figure 2:
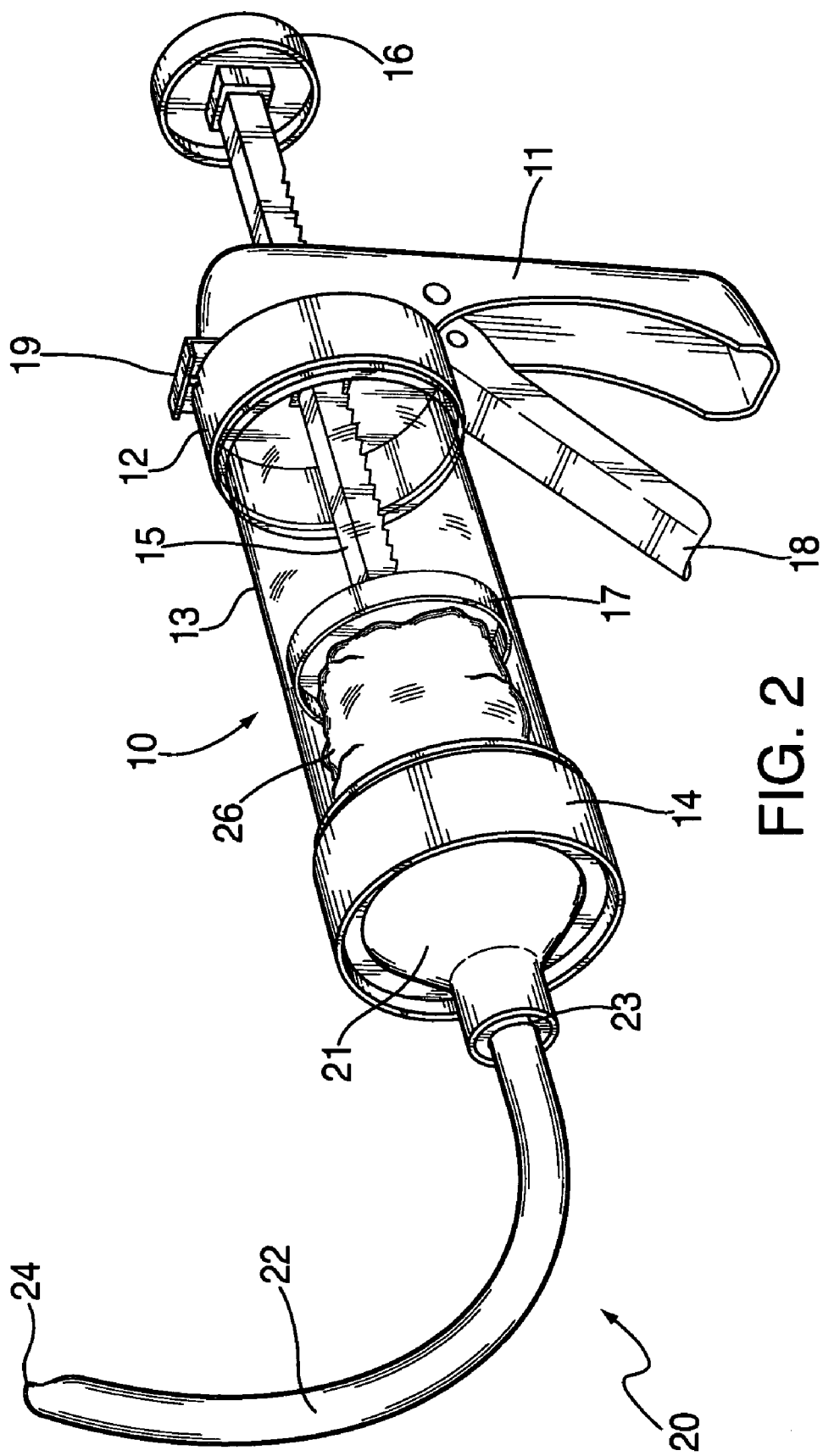
FIG. 2 is a view similar to FIG. 1 but showing the entire invention and pastry filling gun or cake decorating device fully assembled.

A bagel or pastry filling device attachable to one end of a standard and well-known pastry filling or cake decorating gun will now be described with reference to the drawings.

Shown at 10 in all four figures, in general, is a standard and very well-known pastry filling or cake decorating device comprising a trigger handle 11 having a nut 12 forming a part thereof as clearly seen in all figures. Nut 12 has internal or female threads for threadably receiving one end of cylinder 13 having a second nut 14, similar to nut 12, threadably engaging the other end, distant from the trigger handle 11, of cylinder 13.

Extending horizontally through trigger handle 11 is a length of serrated "U" shaped rod 15 having a knob 16 disposed at one end thereof.

Attached to one end of the serrated "U" shaped rod is a plunger 17 attached to the "U" shaped rod on the end opposite of knob end 16.

A trigger 18 is disposed in trigger handle 11 and is operatively associated with a mechanism, not shown, in trigger handle 11 whereby when trigger 18 is squeezed the serrated "U" shaped rod 15, knob 16 and plunger 17 are caused to move, horizontally, and forwardly in cylinder 13. When the "U" shaped rod reaches the end of its travel it may be pulled backward in the cylinder by pushing clip 19 and holding it down as the rod is being pulled backward. The inventive concept of the invention is shown generally as 20 in all four figures. The inventive concept comprising a flared funnel 21 having a length of bent tubing 22 inserted into one end thereof opposite the flared end and held in place by means of a metal insert 23.

The end 24 of bent tubing 22 opposite the end inserted into the flared funnel 21 is sharpened to make it easier to insert bent tubing 22 into the bagel or donut or pastry such as seen at 25.

As shown in all four figures a bagel or donut or other pastry filling is shown at 26.

The flared funnel 21 is inserted into second nut 14 and is held in place on one end of cylinder 13 when this second nut 14 threadably engages cylinder 13 at its end opposite trigger handle 11.

OPERATION OF THE INVENTION

In operation, knob 16 is used to pull "U" shaped rod 15 backward when clip 19 is pushed and held downwardly. The plunger 17 obviously moves backward with "U" shaped rod 15. The filling to be inserted into bagel 25 is then placed inside cylinder 13 between plunger 17 and flared funnel 21.

As trigger handle 11 and trigger 18 are squeezed together rod 15 and therefore plunger 17 are caused to move forward and press filling 26 into flared funnel 21 and therefore through bent tubing 22 with the filling being discharged through tubing end 24 and into the object, a bagel, to be filled.

When the plunger 17 has reached the end of its stroke, clip 19 is pushed downwardly and knob 16 is pulled such that the "U" shaped rod moves backward toward the trigger handle 11 at which time more filling 26 can be added and second nut 14 again engages threads on the end of cylinder 13.

In filling the bagel or pastry with cream cheese or the like tubing end 24 is inserted into the pastry or bagel and rotated 180 degrees. The tubing 22 is then gently withdrawn while at the same time the pastry filling or cake decorating device 10 is operated as described above such that filling is pressed into the flared funnel and through the bent tubing and the filling is discharged into the channel formed by the insertion of bent tubing 22 into the object to be filled.

Therefore, at this time, there is a channel of filling along one interior side of the bagel or pastry.

The bagel or pastry is then rotated about an imaginary axis such that tubing 22 can again be inserted into the other half of the object to be filled. The same procedure for filling the first half of the object to be filled is now repeated to fill a channel formed in this half such that the object is now filled along both side channels with but one entry hole.

Though the invention has been described and illustrated with reference to a preferred embodiment thereof, those skilled in the art will appreciate that various changes and modifications in shape, size, composition and arrangements of parts, may be resorted to without departing from the spirit of the invention or scope of the subjoined claims.

What is claimed is:

1. A bagel or pastry filling device attachable to one end of a standard and well-known pastry filling or cake decorating gun comprising:
   (a) a flared funnel;
   (b) a length of bent tubing inserted into one end of said flared funnel in the end opposite the flared end of said flared funnel; and,
   (c) a metal insert disposed into the end of the flared funnel opposite the flared end thereof for holding said length of bent tubing in place.

2. Bagel or pastry filling device of claim 1 wherein one end of said bent tubing, opposite the end inserted into said flared funnel is sharpened to make it easier to insert said bent tubing into a bagel or donut or pastry.

3. The bagel and pastry filling device of claim 2 wherein bagel or pastry filling is pressed into said flared funnel and therefore through said bent tubing with the filling therefore being discharged through said length of bent tubing and into the object to be filled.

* * * * *